US009226245B2

(12) United States Patent
Dimou et al.

(10) Patent No.: US 9,226,245 B2
(45) Date of Patent: Dec. 29, 2015

(54) UPLINK POWER CONTROL FOR MACHINE TYPE COMMUNICATION DEVICES

(71) Applicants: Konstantinos Dimou, Stockholm (SE); Kumar Balachandran, Pleasanton, CA (US); Havish Koorapaty, Saratoga, CA (US); Chester Sungchung Park, San Jose, CA (US)

(72) Inventors: Konstantinos Dimou, Stockholm (SE); Kumar Balachandran, Pleasanton, CA (US); Havish Koorapaty, Saratoga, CA (US); Chester Sungchung Park, San Jose, CA (US)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 567 days.

(21) Appl. No.: 13/632,589

(22) Filed: Oct. 1, 2012

(65) Prior Publication Data
US 2014/0094204 A1 Apr. 3, 2014

(51) Int. Cl.
*H04W 52/28* (2009.01)
*H04W 52/24* (2009.01)
*H04W 52/36* (2009.01)
*H04W 52/14* (2009.01)

(52) U.S. Cl.
CPC ............ *H04W 52/28* (2013.01); *H04W 52/242* (2013.01); *H04W 52/243* (2013.01); *H04W 52/285* (2013.01); *H04W 52/288* (2013.01); *H04W 52/367* (2013.01); *H04W 52/146* (2013.01); *Y02B 60/50* (2013.01)

(58) Field of Classification Search
None
See application file for complete search history.

(56) References Cited

U.S. PATENT DOCUMENTS

| 5,930,684 A | 7/1999 | Keskitalo et al. |
| 2004/0247993 A1* | 12/2004 | Johnson et al. ................. 429/50 |
| 2005/0197150 A1* | 9/2005 | Sarkar et al. ................. 455/522 |

FOREIGN PATENT DOCUMENTS

| WO | 9851026 A1 | 11/1998 |
| WO | 0199303 A2 | 12/2001 |

OTHER PUBLICATIONS

International search report, International application No. PCT/IB2013/058859. Date of mailing: May 13, 2014. European Patent Office, Rijswijk, NL.
3GPP. Technical Specification Group Radio Access Network; Evolved Universal Terrestrial Radio Access (E-UTRA); Requirements for support of radio resource management (Release 9). 3GPP TS 36.133. V9.12.0. Jun. 2012. 3GPP, Sophia Antipolis, France.
3GPP. Technical Specification Group Services and System Aspects; System Improvements for Machine-Type Communications (MTC) (Release 11). 3GPP TR 23.888 V11.0.0. Sep. 2012. 3GPP, Sophia Antipolis, France.

* cited by examiner

*Primary Examiner* — Philip Sobutka
(74) *Attorney, Agent, or Firm* — Coats & Bennett, PLLC

(57) ABSTRACT

An access node is configured to adapt uplink power control procedures based on the device attributes of a wireless device. The device attributes may, for example be the mobility, energy profile, or characteristic traffic pattern of the wireless device. The adaptive uplink power control procedure may be used to minimize or reduce power consumption, to improve resource utilization efficiency, or to reduce interference levels.

46 Claims, 9 Drawing Sheets

UPLINK POWER CONTROL FOR MACHINE TYPE COMMUNICATION DEVICES

TECHNICAL FIELD

The present invention relates generally to uplink power control in wireless communication networks and, more particularly, to uplink power control for machine type communication devices.

BACKGROUND

Machine-to-machine (M2M) communication, also referred to as machine-type communication (MTC), is the communication of data between machines with little or no human interaction. It is expected that in the near future, a large percentage of network traffic may originate from MTC devices. Therefore, MTC has lately attracted the interest of the wireless communications industry.

Signaling protocols and resource management procedures in existing networks were designed to accommodate human-generated traffic. However, the traffic generated by MTC devices differs from most human-generated traffic. Using the same signaling protocols for MTC devices can lead to inefficient radio resource utilization.

The amount of signaling required to set-up or terminate a communication session is one area of concern. The existing signaling protocols used to setup and terminate sessions were conceived of to support transmission of large amounts of data at high data rates. An MTC device, in contrast, will typically send small amounts of data infrequently at low data rates. Thus, the signaling overhead to establish a connection for MTC devices will be greater and consume more radio resources in relative terms than for human-generated traffic.

Uplink power control is another area of concern. The existing uplink power control mechanism, as specified within the Third Generation Partnership Project (3GPP) standard 36.133 is too complicated for M2M communications and is not optimal because it does not take into consideration specific characteristics and behaviors of MTC devices.

Accordingly, there continues to be a need for improvements in signaling and radio resource control procedures for M2M communications to improve energy efficiency and resource utilization efficiency.

SUMMARY

Exemplary embodiments of the invention comprise methods of uplink power control implemented by an access node in a wireless communication network. In one exemplary embodiment, the access node determines one or more device attributes for a wireless device and selects a power control procedure from a set of two or more different power control procedures as a function of the one or more device attributes. The access node generates power control commands according to the selected power control procedure.

In another exemplary method, the access node determines the mobility of a wireless device and selects a power control procedure from a set of two or more different power control procedures as a function of the mobility of the wireless device. The access node generates power control commands according to the selected power control procedure.

In another exemplary method, the access node determines the energy profile of a wireless device and selects a power control procedure from a set of two or more different power control procedures as a function of the energy profile of the wireless device. The access node generates power control commands according to the selected power control procedure.

Other embodiments of the invention comprise an access node in a wireless communication network. The access node comprises a transceiver circuit for communicating with one or more wireless devices, and a control circuit connected to the transceiver circuit for controlling the uplink transmit power of the wireless devices. In one exemplary embodiment, the control circuit is configured to determine one or more device attributes for a wireless device, and to select a power control procedure from a set of two or more different power control procedures as a function of the one or more device attributes. The control circuit is further configured to generate power control commands according to the selected power control procedure.

In another exemplary embodiment, the control circuit in the access node is configured to determine the mobility of a wireless device, and to select a power control procedure from a set of two or more different power control procedures as a function of the mobility of the wireless device. The control circuit is further configured to generate power control commands according to the selected power control procedure.

In another exemplary embodiment, the control circuit in the access node is configured to determine the energy profile of a wireless device, and select a power control procedure from a set of two or more different power control procedures as a function of the energy profile of the wireless device. The control circuit is further configured to generate power control commands according to the selected power control procedure.

Adapting the uplink power control procedure for a wireless device depending on device attributes of the wireless device can be used to minimize energy consumption, improve radio resource utilization efficiency, and reduce interference among cells. In the case of MTC devices with only limited power supplies, priority may be placed on minimizing power consumption. On the other hand, if a MTC device has access to unlimited power, priority may be given to other considerations, such as resource utilization efficiency and interference management.

DETAILED DESCRIPTION

Figure 1:
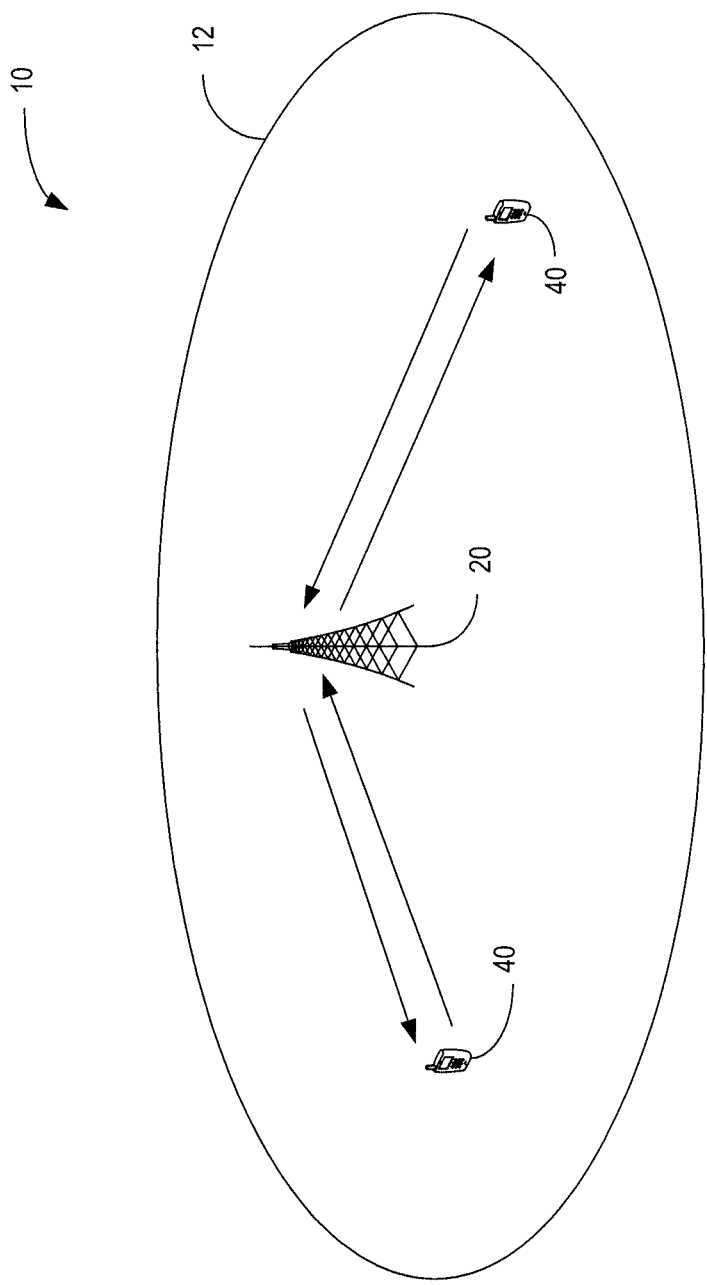
FIG. 1 illustrates an exemplary network including an access node implementing uplink power control for MTC devices as herein described.

FIG. 1 illustrates an exemplary communication network for M2M communications. The communication network 10 includes a plurality of cells 12. Only one cell 12 is shown in FIG. 1 though. Each cell 12 includes one or more wireless access nodes 20 that communicate with wireless devices 40 within the cell 12. The communication network 10 may operate according to any standard that employs uplink power control. For illustrative purposes, an exemplary embodiment will be described in the context of a network 10 operating according to the Third Generation Partnership Project (3GPP) Long Term Evolution (LTE) Release 11 standard. Those skilled in the art will appreciate, however, that the present invention is more generally applicable to other wireless communication systems, including Wideband Code Division Multiple Access (WCDMA), and Worldwide Interoperability for Microwave Access (WiMAX) systems.

The wireless devices 40 may comprise machine-type communication (MTC) devices for collecting and reporting data over a communication network, or may comprise non-MTC devices. MTC has been defined as using a specific type of wireless communication network traffic. See, e.g., 3GPP Technical Report 23.888, "System Improvements for Machine-Type Communications," the disclosure of which is incorporated herein by reference in its entirety. One example of a MTC device is a gas or power meter with a wireless transceiver for reporting usage of gas or electrical power to a server at predetermined time periods. Non-MTC devices are devices, such as cell phones, smart phones, laptop computers, etc., used for voice and data communication by human users. A MTC device may comprise a dedicated device specifically for data collection and reporting. In other embodiments, a wireless device 40 may function part of the time as a MTC device and part of the time as a non-MTC device.

In exemplary embodiments of the invention, the wireless access nodes 20 control the transmit power of the wireless devices 40 on the uplink. Different uplink power control mechanisms may be used for MTC devices and non-MTC devices. For MTC devices, the uplink power control procedure takes into consideration device attributes of the wireless device 40 in addition to other conventional parameters, such as signal strength, interference, etc. The device attributes for wireless devices 40 may include, for example, the mobility, energy profile, and characteristic traffic pattern of the wireless device 40.

Depending on the device attributes, the uplink power control procedure may be employed to minimize or reduce power consumption, to improve resource utilization efficiency, or to reduce interference levels. In the case of MTC devices with only limited power supplies, priority may be placed on minimizing power consumption. On the other hand, if a MTC device has access to unlimited power, priority may be given to other considerations, such as resource utilization efficiency and interference management.

In one embodiment, the mobility attribute indicates whether the wireless device 40 is mobile or static. When the wireless device 40 is moving, conventional uplink power control procedures as specified in the 3GPP LTE Release 11 standard may be used. When the wireless device 40 is static, the uplink power control algorithm can be adapted to minimize or reduce power consumption, to improve radio resource utilization, or to reduce interference.

The energy profile attribute indicates whether the wireless device 40 has access to a limited power supply or an unlimited power supply. When a wireless device 40 has access to a limited power supply, it may be desirable to use an uplink power control procedure designed to minimize or reduce energy consumption. If the wireless device 40 has access to an unlimited power supply, an uplink power control procedure may be selected to improve radio resource utilization efficiency, or to reduce interference.

The traffic pattern attribute indicates characteristic transmission patterns of the wireless device 40 in terms of packet size and frequency. For example, a wireless device 40 attached to a sensor may send a small amount of data to a server with a given frequency (e.g., once every hour or once every day). The uplink power control procedure can be adapted based on differences in the characteristic traffic patterns.

Figure 2:
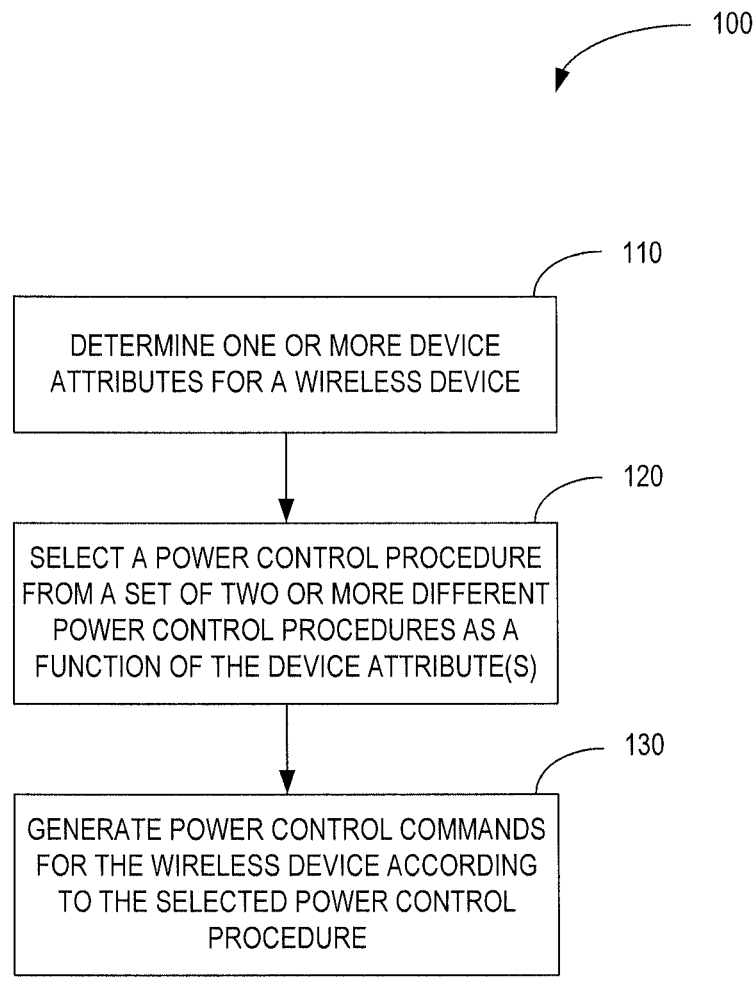
FIG. 2 illustrates an exemplary procedure implemented by an access node for uplink power control according to a first embodiment.

FIG. 2 illustrates an exemplary method 100 for uplink power control according to one embodiment. The method 100 may be implemented by an access node 20 in a wireless communication network 10. The access node 20 determines one or more device attributes for a wireless device 40 (block 110). Based on the set of device attributes, the access node 20 selects a power control procedure for the wireless device 40 from a set of two or more different power control procedures (block 120). The access node 20 then generates power control commands for the wireless device 40 according to the selected power control procedure (block 130).

Figure 3:
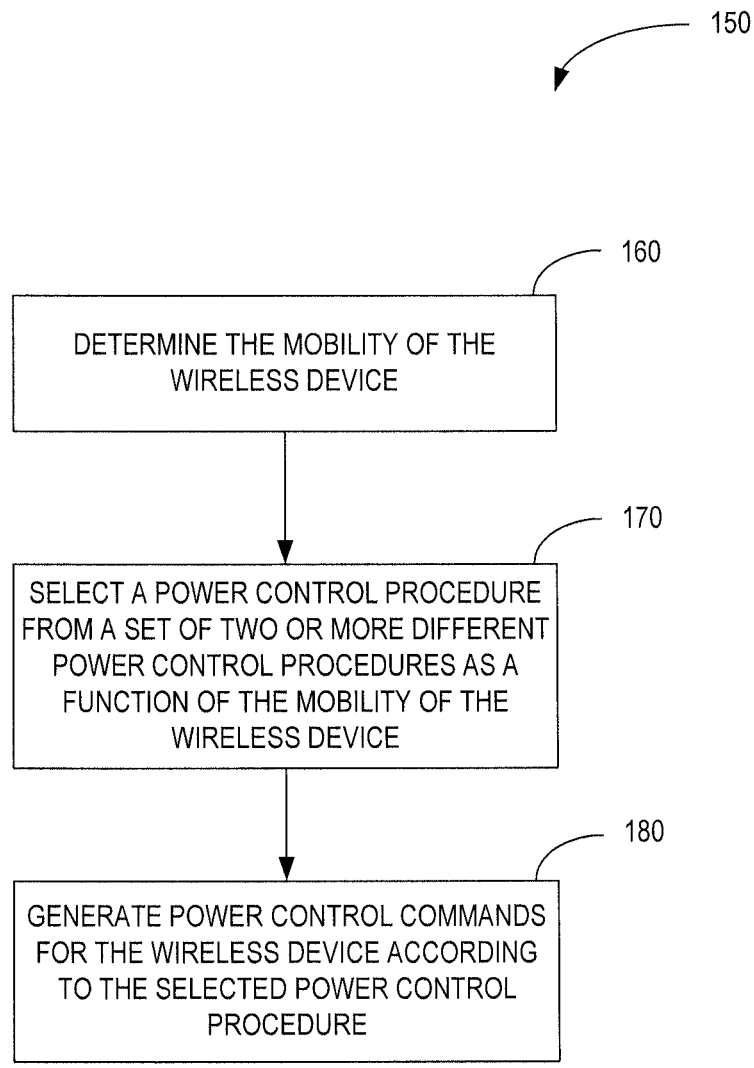
FIG. 3 illustrates an exemplary procedure implemented by an access node for uplink power control according to a second embodiment.

FIG. 3 illustrates a method 150 for uplink power control according to a second embodiment. The method 150 may be implemented by an access node 20. The method 150 selects a uplink power control procedure as a function of the mobility of the wireless device 40. This may include, for example, comparing the mobility of the wireless device 40 to a mobility threshold. The access node 20 determines the mobility of the wireless device 40 (block 160). The access node 20 then selects a power control procedure from a set of two or more different power control procedures as a function of the mobility of the wireless device 40 (block 170). The access node 20 generates power control commands for the wireless device 40 according to the selected power control procedure (block 180).

Figure 4:
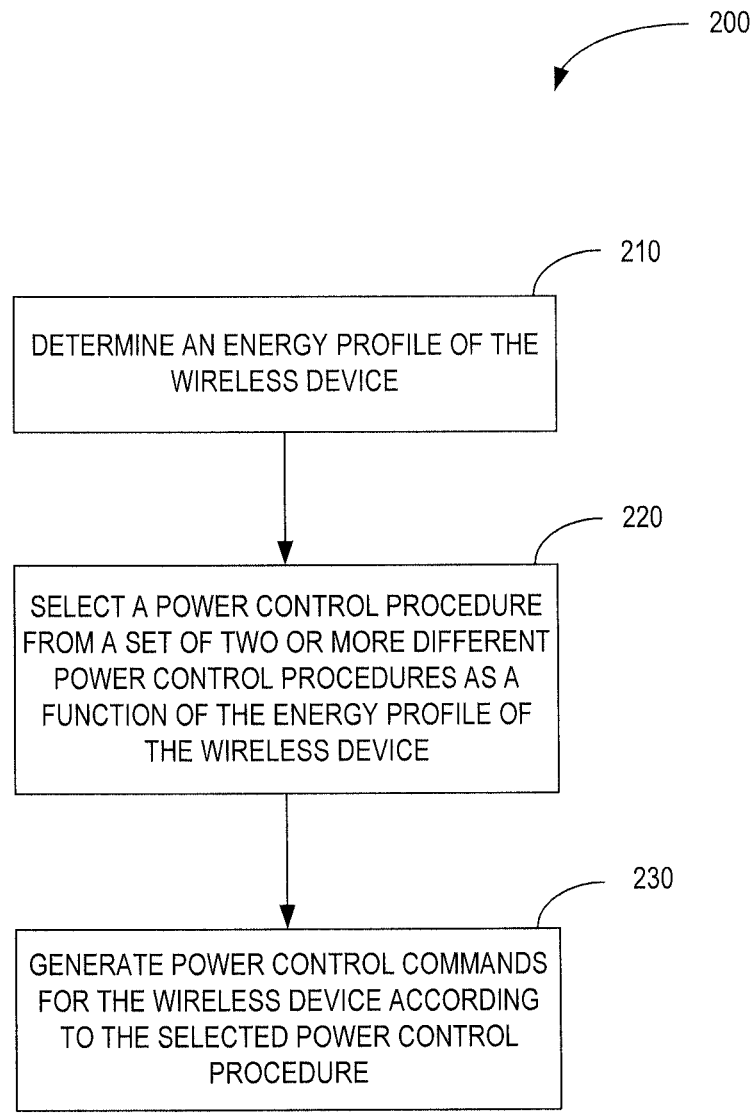
FIG. 4 illustrates an exemplary procedure implemented by an access node for uplink power control according to a third embodiment.

FIG. 4 illustrates a method 200 of uplink power control according to a third embodiment. The method 200 may be implemented by an access node 20. The method 200 selects a uplink power control procedure as a function of the energy profile of the wireless device 40. The access node 20 determines an energy profile of the wireless device 40 (block 210). The access node then selects a power control procedure from a set of two or more different power control procedures as a function of the energy profile of the wireless device 40 (block 220). The access node 20 generates power control commands for the wireless device 40 according to the selected power control procedure (block 230).

Figure 5:
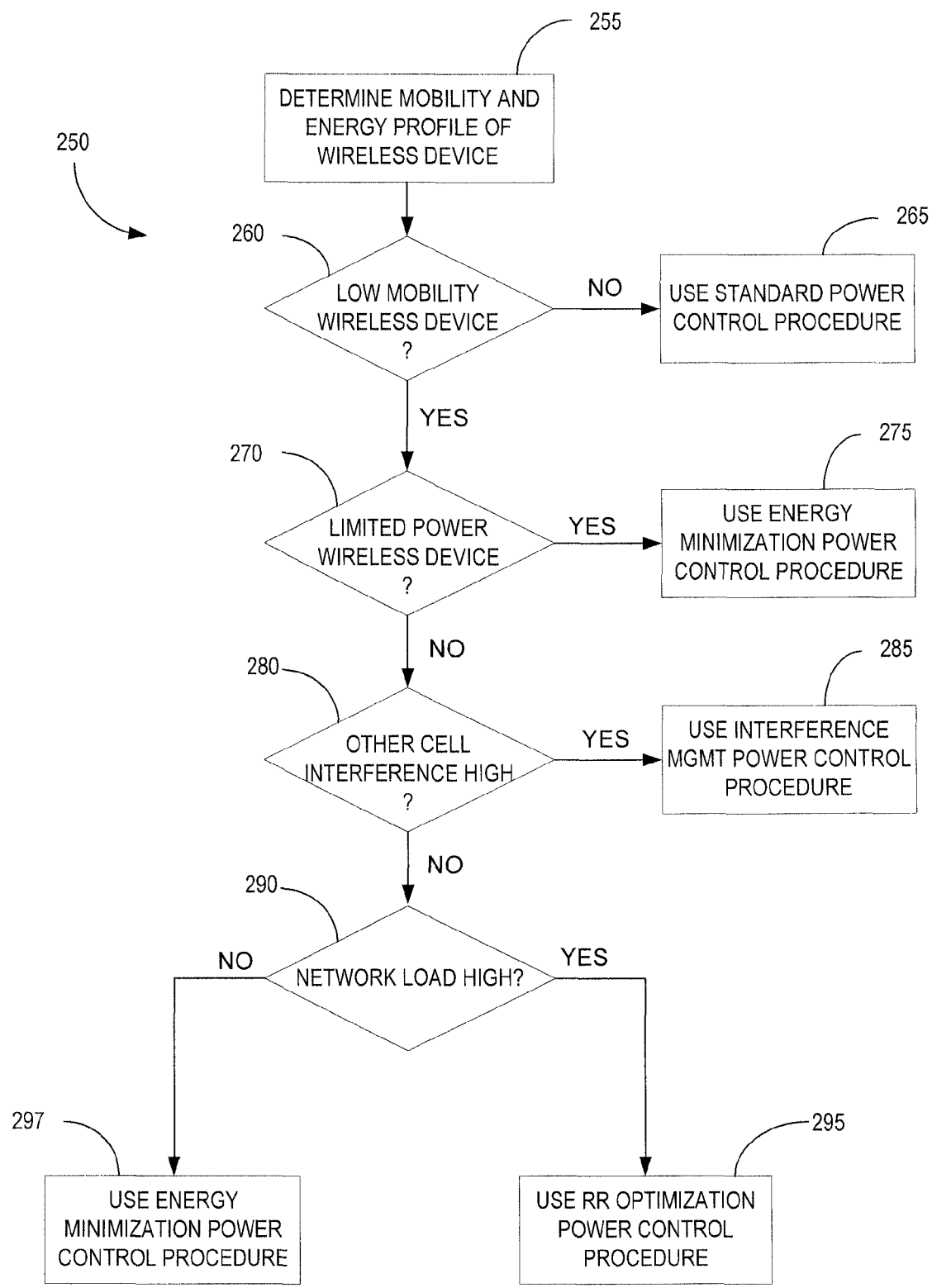
FIG. 5 illustrates an exemplary procedure implemented by an access node for uplink power control according to a fourth embodiment.

FIG. 5 illustrates a method 250 of uplink power control according to a fourth embodiment. This method 250, which may be implemented by an access node 20, determines a power control procedure as a function of the mobility and energy profile of the wireless device 40. The access node 20 determines the mobility and energy profile of a wireless device 40 (block 255). In this exemplary embodiment, the access node 20 determines whether the wireless device 40 is a low mobility device or high mobility device (i.e., whether the mobility of the wireless device 40 is below or above a mobility threshold) (block 260). If the wireless device 40 is a high mobility device, the access node 20 uses the regular power control procedure specified in the 3GPP LTE release 11 standard (block 265). This power control procedure may be the same procedure used for non-MTC devices. If the access node 20 determines that the wireless device 40 is a low mobility device (i.e., the mobility of the wireless device 40 is below the mobility threshold), the access node 20 then determines whether the wireless device 40 has a limited or unlimited power supply (block 270). If the wireless device 40 has a limited power supply, the access node 20 uses an energy minimization power control procedure (block 275). If the wireless device 40 has an unlimited power supply, the access node 20 determines the level of other-cell interference (block 280). If other-cell interference is above an interference threshold, the access node 20 may use an interference management power control procedure (block 285). The access node 20 determines whether network load is high (i.e. above a threshold) (block 290). If the network load is high, the access node 20 may use a radio resource optimization power control procedure (block 295). Otherwise, if the network load is not high, the access node 20 may use an energy minimization power control procedure (block 297).

The energy minimization power control procedure attempts to minimize energy per transmitted packet, denoted as E, without increasing delay significantly. The transmit power $P_T$ minimizing the energy consumption is computed as a function of the path loss, bandwidth, and signal-to-interference plus noise ratio (SINR). In one exemplary embodiment, the power control algorithm sets the transmit power $P_T$ for the wireless device such that the received SINR is about 0 dB. If delay is not a concern, then the power control algorithm may set the transmit power $P_T$ for the wireless device 40 at about −6 dB, for example.

The transmit power $P_T$ minimizing the energy consumption is given by:

$$P_T = \arg\min\{E\} \qquad \text{Eq. (1)}$$

The energy per transmitted packet E of a given size and bandwidth is computed according to:

$$E = P_T * T_T + E_{activity} \qquad \text{Eq. (2)}$$

where $T_T$ is the transmission time and $E_{activity}$ is the energy consumed by the wireless device 40 when it is active (in addition to the energy consumed due to transmission). In some cases, transmitting over a longer time period (i.e., with lower rate and smaller transmission power), may result in lower consumed energy per packet. The transmission time is given by:

$$T_T = N_b T_b \qquad \text{Eq. (3)}$$

where $N_b$ represents the number of information bits in a packet and $T_b$ represents the bit period. Therefore, it follows that given a certain packet size, a certain path loss, PL and a certain bandwidth W, the minimization of energy consumed for transmitting a packet is equivalent to the minimization of energy consumed for transmitting a bit (i.e., $E_b = P_T T_b$).

The received signal power $P_R$ is given by:

$$P_R = P_T \cdot PL \qquad \text{Eq. (4)}$$

The received SINR is given by:

$$SINR = \frac{P_R}{N_0 W} \qquad \text{Eq. (5)}$$

where $N_0$ includes both thermal noise and interference.

Figure 6:
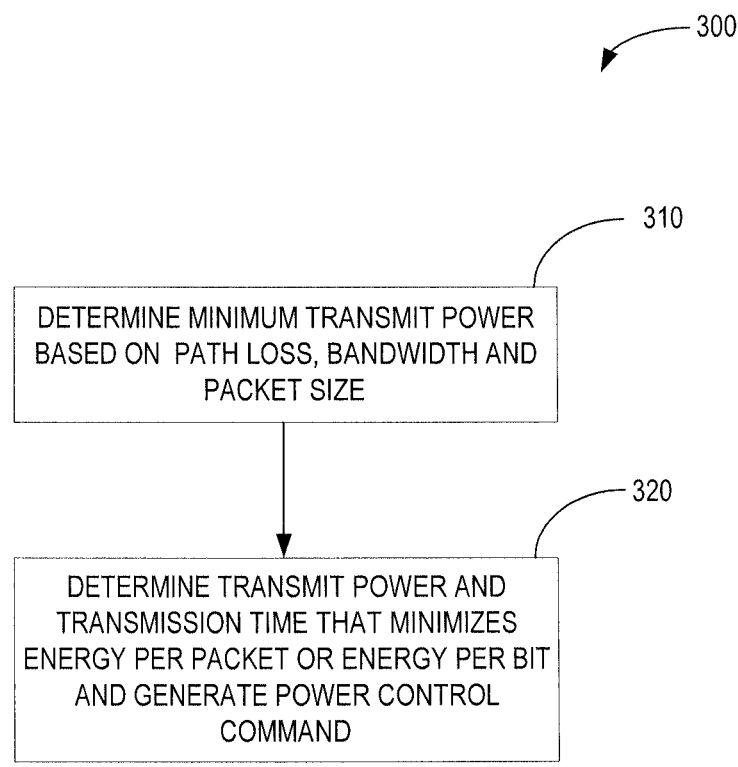
FIG. 6 illustrates an uplink power control procedure for energy minimization.

FIG. 6 illustrates an exemplary uplink power control procedure 300 for determining the transmit power $P_T$ for a wireless device 40 that minimizes the energy per transmitted bit.

To determine the transmit power $P_T$, the access node 20 computes a minimum transmit power $P_T$ that meets a minimum signal quality (e.g., SINR), requirement based on the path loss to the serving access node 20, the bandwidth W of the transmission, the noise-plus-interference power at the receiver side, and the packet size. The minimum transmit power can then be determined according to Eq. (4) (block 310). The minimum received signal power may be computed according to Eq. (5). The minimum transmit power $P_T$ can then be computed according to Eq. (4). The access node 20 can then compute the energy per transmitted packet E according to Eq. (2) for different values of $P_T$ (equal to or greater than the minimum $P_T$) and $T_T$ to find the pair $\{P_T, T_T\}$ that minimizes E, and may correspondingly generate a power control command (block 320). The transmission time $T_T$ can be computed according to Eq. (3). As previously noted, transmitting with a longer transmission time $T_T$, i.e., with lower rate and smaller transmission power, may result in lower consumed energy per packet.

The interference management power control procedure attempts to limit the amount of interference to other cells 12. The transmit power $P_T$ is computed as a function of the path loss and packet size. The transmit power $P_T$ is given by:

$$P_T = \min\{P_{max}, P_0 + \alpha \cdot PL_{DL} + \Delta_{MCS} + \beta + \delta\} \qquad \text{Eq. (6)}$$

where $P_0$ is a cell-specific parameter that is broadcast as part of system information, and α is a path loss parameter. The path loss parameter α is a function of the ratio between path loss to both serving access node 20, $PL_{DL}$, and an access node 20 in the strongest neighbor cell 12, $PL_{DL\_neighbor}$. The path loss parameter α is given by:

$$\alpha = f\left(\frac{PL_{DL}}{PL_{DL:Neighbor}}\right) \qquad \text{Eq. (7)}$$

The path loss parameter α may be computed by the access node 20 based on RSRP (reference symbol received power) measurements done both on the serving and neighboring cells 12. The factor β is a function of the packet size. $\Delta_{MCS}$ is a power offset that is dependent on the modulation and coding scheme used for the transmission. The δ parameter is the power control parameter. The access node 20 controls the transmit power $P_T$ by sending commands that adjust the value of the δ parameter.

Figure 7:
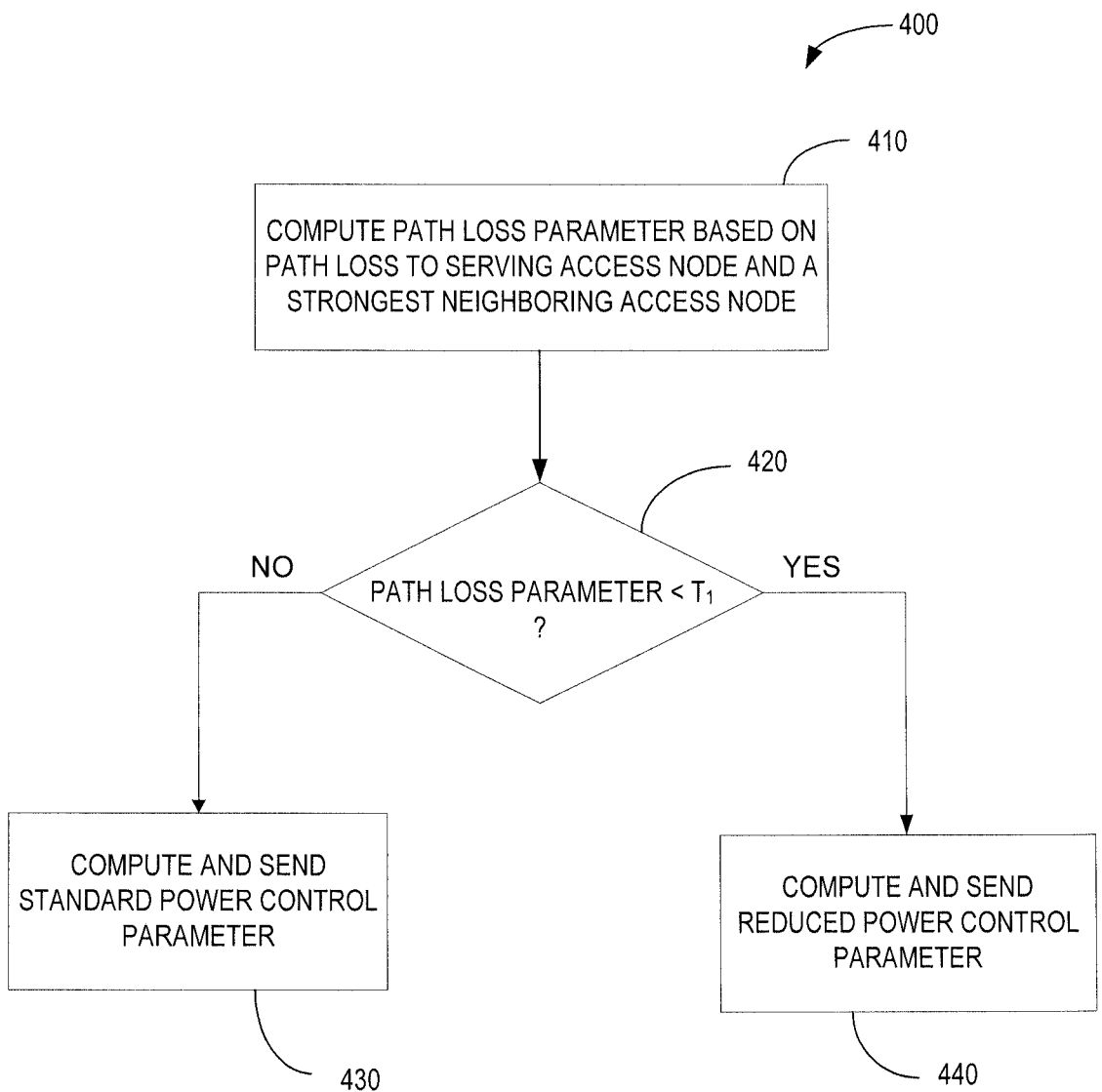
FIG. 7 illustrates an uplink power control procedure for interference reduction.

FIG. 7 illustrates an exemplary uplink power control procedure 400 for determining the transmit power $P_T$ for a wireless device 40 that reduces interference. The access node 20 computes the path loss parameter according to Eq. (7) based on the path loss to the serving access node 20 and the strongest neighbor access node 20 (block 410). A wireless device 40 that is close to a cell edge (and thus generates more interference for other cells 12) will typically have a lower value for the path loss parameter α. The computed path loss parameter α is then compared to a first threshold $T_1$ (block 420). If the path loss parameter is greater than $T_1$, the access node 20 computes the power control parameter δ normally as specified in the 3GPP LTE Release 11 standard and sends the power control parameter δ to the wireless device 40 (block 430). In this case, the wireless device 40 is not deemed to be a significant interference source. If the path loss parameter is greater than $T_1$, indicating that the wireless device 40 is a potentially significant interference source, the access node 20 computes a reduced power control parameter δ and sends the reduced power control parameter δ to the wireless device 40 to reduce interference to other cells 12 (block 440).

MTC devices typically transmit the same amount of information from one transmission to the next. Therefore, the values for $\Delta_{MCS}$ and $\beta$ may be the same for most transmissions and therefore may be semi-statically configured.

The radio resource (RR) optimization power control procedure attempts to reduce the amount of radio resources used for a data transmission by increasing the transmit power when conditions allow. Increasing the transmit power means that fewer packets will be lost and therefore fewer retransmissions will be required. The RR optimization power control procedure computes the path loss parameter $\alpha$ according to Eq. (6) above as a function of the path loss and packet size.

Figure 8:
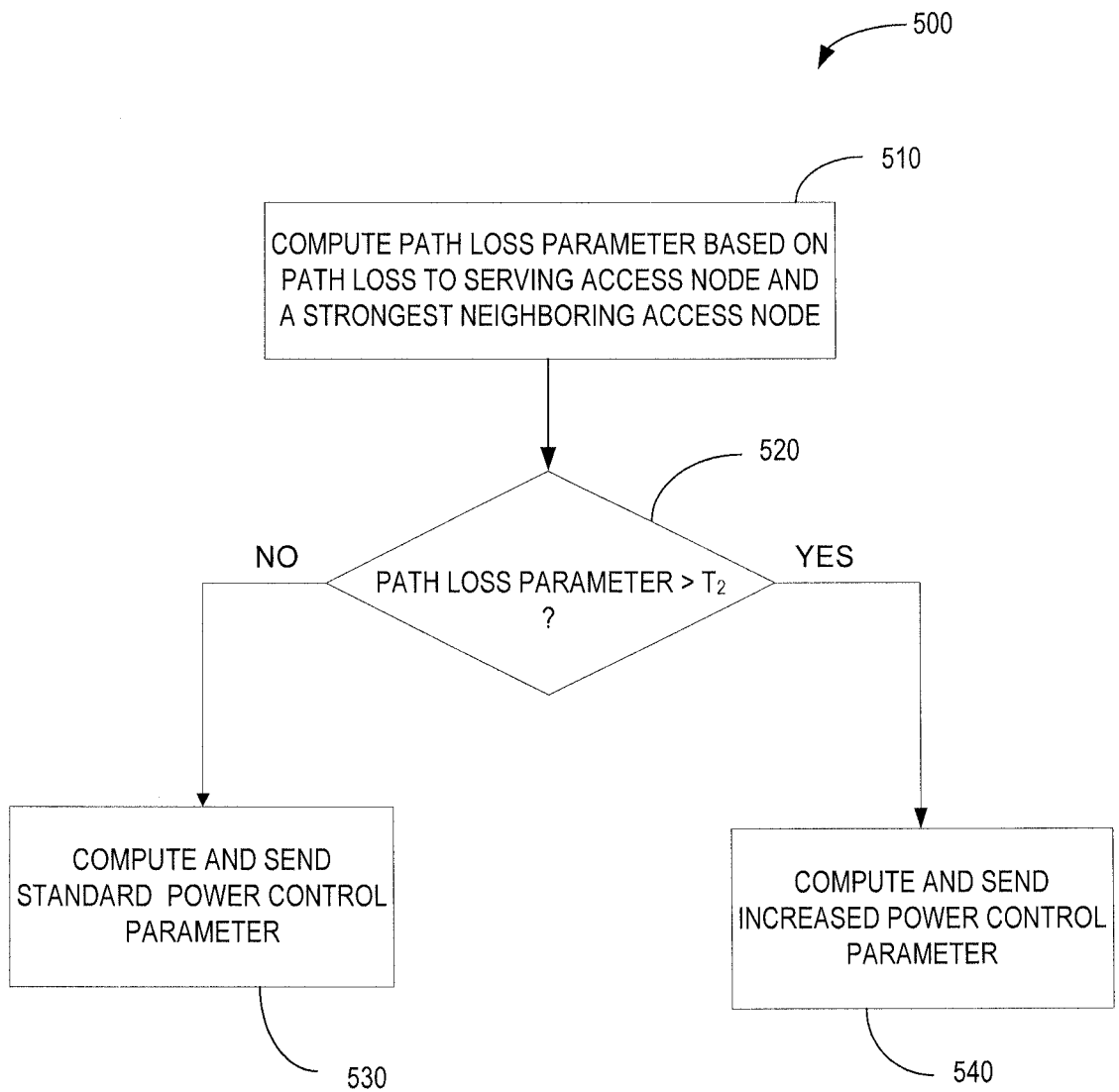
FIG. 8 illustrates an uplink power control procedure for radio resource utilization efficiency.

FIG. 8 illustrates an exemplary uplink power control procedure 500 for determining the transmit power $P_T$ for a wireless device 40 that reduces the amount of radio resources used. The access node 20 computes the path loss parameter $\alpha$ according to Eq. (7) based on the path loss to the serving access node 20 and the strongest neighbor access node 20 (block 510). A wireless device 40 that is close to a serving access node 20 (and thus have lower path loss to the serving access node 20) will typically have a higher value for the path loss parameter $\alpha$. The computed path loss parameter $\alpha$ is then compared to a second threshold $T_2$ (block 520). If the path loss parameter $\alpha$ is less than $T_2$, the access node 20 computes the power control parameter $\delta$ normally as specified in the 3GPP LTE Release 11 standard and sends the power control parameter $\delta$ to the wireless device 40 (block 530). If the path loss parameter $\alpha$ is greater than $T_2$, indicating low path loss, the access node 20 increases the $\delta$ parameter to increase radio resource utilization efficiency and sends the increased path loss parameter to the wireless device 40 (block 540).

Figure 9:
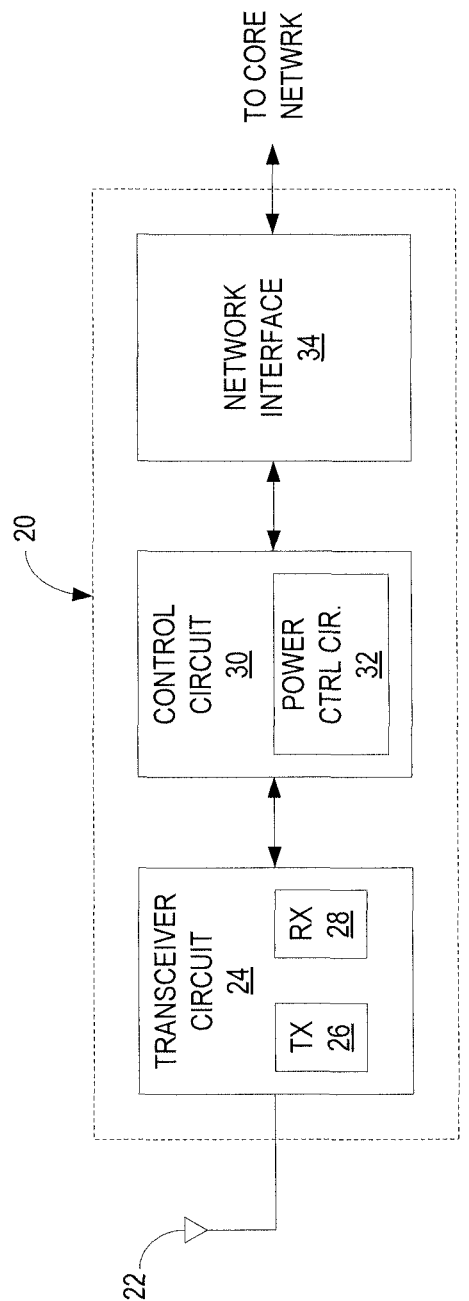
FIG. 9 illustrates an exemplary access node implementing uplink power control as herein described.

FIG. 9 illustrates the main functional elements of an access node 20 according to one exemplary embodiment. The access node 20 comprises a transceiver circuit 24 coupled to one or more antennas 22, a control circuit 30, and network interface 34. The transceiver circuit 24 comprises a transmitter 26 and receiver 28 that operate according to any communication protocol, such as the WCDMA or LTE standards. The control circuit 30 controls the operation of the wireless device 40 and implements the data and control plane components of the radio protocols pertinent to over-the-air transmission and reception of the signal. The control circuit 30 may be implemented by one or more processors, hardware, firmware, or a combination thereof. The control circuit 30 includes a power control circuit 32 to perform uplink power control as herein described. The network interface 34 provides connection to a core network.

Thus, the foregoing description and the accompanying drawings represent non-limiting examples of the methods and apparatus taught herein. As such, the present invention is not limited by the foregoing description and accompanying drawings. Instead, the present invention is limited only by the following claims and their legal equivalents.

What is claimed is:

1. A method of uplink power control implemented by an access node in a wireless communication network, said method comprising:
   determining device attributes for a wireless device including a mobility of the wireless device and an energy profile of the wireless device;
   selecting a power control procedure from a set of two or more different power control procedures as a function of the mobility and energy profile of the wireless device; and
   generating power control commands according to the selected power control procedure; and
   sending the power control commands from the access node to the wireless device.

2. The method of claim 1 wherein selecting a power control procedure from a set of two or more different power control procedures as a function of the mobility and energy profile of the wireless device comprises:
   selecting a high mobility power control procedure if the mobility of the wireless device is greater than a mobility threshold; and
   selecting between two or more alternative power control procedures as a function of the energy profile if the mobility of the wireless device is lower than the mobility threshold.

3. The method of claim 2 wherein:
   determining an energy profile of the wireless device comprises determining whether the wireless device has a limited power supply; and
   selecting between two or more alternative power control procedures as a function of the energy profile comprises selecting an energy minimization power control procedure if the wireless device has a limited power supply.

4. The method of claim 3 wherein selecting between two or more alternative power control procedures as a function of the energy profile further comprises selecting between a radio resource optimization power control procedure and an interference management power control procedure if the wireless device does not have a limited power supply.

5. The method of claim 4 wherein selecting between a radio resource optimization power control procedure and an interference management power control procedure if the wireless device does not have a limited power supply comprises:
   determining an amount of other cell interference;
   selecting the radio resource optimization power control procedure if the other cell interference is below an interference threshold; and
   selecting the interference management power control procedure if the other cell interference is above the interference threshold.

6. The method of claim 3 wherein selecting between two or more alternative power control procedures as a function of the energy profile comprises selecting between an energy minimization power control procedure and an interference management power control procedure if the wireless device does not have a limited power supply.

7. The method of claim 6 wherein selecting between the energy minimization power control procedure and the interference management power control procedure if the wireless device does not have a limited power supply comprises:
   determining an amount of other cell interference; and
   selecting the energy minimization power control procedure if the other cell interference is below an interference threshold; and
   selecting the interference management power control procedure if the other cell interference is above the interference threshold.

8. The method of claim 1 wherein:
   determining an energy profile of the wireless device comprises determining whether the wireless device has a limited power supply; and
   selecting a power control procedure from a set of two or more different power control procedures as a function of the mobility and energy profile of the wireless device comprises selecting an energy minimization power control procedure if the wireless device has a limited power supply.

9. The method of claim 8 wherein selecting a power control procedure as a function of the energy profile further comprises selecting between a radio resource optimization power control procedure and an interference management power control procedure if the wireless device does not have a limited power supply.

10. The method of claim 9 wherein selecting between a radio resource optimization power control procedure and an interference management power control procedure if the wireless device does not have a limited power supply comprises:
   determining an amount of other cell interference;
   selecting the radio resource optimization power control procedure if the other cell interference is below an interference threshold; and
   selecting the interference management power control procedure if the other cell interference is above the interference threshold.

11. The method of claim 8 wherein selecting a power control procedure as a function of the energy profile further comprises selecting between an energy minimization power control procedure and an interference management power control procedure if the wireless device does not have a limited power supply.

12. The method of claim 11 wherein selecting between the energy minimization power control procedure and an interference management power control procedure if the wireless device does not have a limited power supply comprises:
   determining an amount of other cell interference; and
   selecting the energy minimization power control procedure if the other cell interference is below an interference threshold; and
   selecting the interference management power control procedure if the other cell interference is above the interference threshold.

13. The method of claim 1 wherein selecting a power control procedure from a set of two or more different power control procedures as a function of the mobility of the wireless device and the energy profile of the wireless device comprises selecting from a set of power control procedures including:
   a low mobility power control procedure;
   an energy minimization power control procedure; and
   a radio resource optimization power control procedure.

14. The method of claim 1 wherein selecting a power control procedure from a set of two or more different power control procedures as a function of the mobility of the wireless device and the energy profile of the wireless device comprises selecting from a set of power control procedures including:
   a low mobility power control procedure;
   an energy minimization power control procedure; and
   an interference management power control procedure.

15. The method of claim 1 wherein an energy minimization power control procedure is selected and wherein generating power control commands comprises:
   determining a minimum transmit power based on path loss, bandwidth, noise-plus-interference power, and packet size; and
   determining a transmit power above a minimum transmit power and a transmission time that minimizes energy per packet.

16. The method of claim 1 wherein an interference management power control procedure is selected and wherein generating power control commands comprises:
   computing a path loss parameter based on path loss to a serving access node and a neighboring access node;
   comparing the path loss parameter to a first threshold; and
   if the path loss parameter is less than said first threshold, generating and sending a reduced power control command to reduce interference generated by the wireless device.

17. The method of claim 1 wherein a radio resource optimization power control procedure is selected and wherein generating power control commands comprises:
   computing a path loss parameter based on path loss to a serving access node and a neighboring access node;
   comparing the path loss parameter to a second threshold; and
   if the path loss parameter is greater than said second threshold, generating and sending an increased power control command to the wireless device.

18. An access node in a wireless communication network, said access node comprising:
   a transceiver circuit for communicating with one or more wireless devices; and
   a control circuit connected to said transceiver circuit for controlling the uplink transmit power of said wireless devices, said control circuit being configured to:
      determine device attributes for a wireless device including a mobility of the wireless device and an energy profile of the wireless device;
      select a power control procedure from a set of two or more different power control procedures as a function of the mobility and energy profile of the wireless device; and
      generate power control commands according to the selected power control procedure; and
      send the power control commands from the access node to the wireless device.

19. The access node of claim 18 wherein the control circuit is further configured to:
   select a high mobility power control procedure if the mobility of the wireless device is greater than a mobility threshold; and
   select between one or more alternative power control procedures as a function of the energy profile if the mobility of the wireless device is lower than the threshold.

20. The access node of claim 19 wherein the control circuit is further configured to:
   determine an energy profile of the wireless device by determining whether the wireless device has a limited power supply; and
   select an energy minimization power control procedure if the wireless device has a limited power supply.

21. The access node of claim 20 wherein the control circuit is further configured to select between a radio resource optimization power control procedure and an interference management power control procedure if the wireless device does not have a limited power supply.

22. The access node of claim 21 wherein the control circuit is further configured to select between a radio resource optimization power control procedure and an interference management power control procedure if the wireless device does not have a limited power supply by:
   determining an amount of other cell interference;
   selecting the radio resource optimization power control procedure if the other cell interference is below an interference threshold; and
   selecting the interference management power control procedure if the other cell interference is above the interference threshold.

23. The access node of claim 20 wherein the control circuit is further configured to select between an energy minimization power control procedure and an interference management power control procedure if the wireless device does not have a limited power supply.

24. The access node of claim 23 wherein the control circuit is further configured to select between an energy minimization power control procedure and an interference management power control procedure if the wireless device does not have a limited power supply by:
    determining an amount of other cell interference;
    selecting the energy minimization power control procedure if the other cell interference is low; and
    selecting the interference management power control procedure if the other cell interference is high.

25. The access node of claim 18 wherein the control circuit is further configured to:
    determine an energy profile of the wireless device by determining whether the wireless device has a limited power supply; and
    select an energy minimization power control procedure if the wireless device has a limited power supply.

26. The access node of claim 25 wherein the control circuit is further configured to select between energy minimization power control procedure and an interference management power control procedure if the wireless device does not have a limited power supply.

27. The access node of claim 26 wherein the control circuit is further configured to select between energy minimization power control procedure and an interference management power control procedure if the wireless device does not have a limited power supply by:
    determining an amount of other cell interference;
    selecting the energy minimization power control procedure if the other cell interference is below an interference threshold; and
    selecting the interference management power control procedure if the other cell interference is above the interference threshold.

28. The access node of claim 18 wherein the control circuit is further configured to select between a radio resource optimization power control procedure and an interference management power control procedure if the wireless device does not have a limited power supply.

29. The access node of claim 28 wherein the control circuit is further configured to select between a radio resource optimization power control procedure and an interference management power control procedure if the wireless device does not have a limited power supply by:
    determining an amount of other cell interference;
    selecting the radio resource optimization power control procedure if the other cell interference is below an interference threshold; and
    selecting the interference management power control procedure if the other cell interference is above the interference threshold.

30. The access node of claim 18 wherein the control circuit is further configured to select from a set of power control procedures including:
    a low mobility power control procedure;
    an energy minimization power control procedure; and
    a radio resource optimization power control procedure.

31. The access node of claim 18 wherein the control circuit is further configured to select from a set of power control procedures including:
    a low mobility power control procedure;
    an energy minimization power control procedure; and
    an interference management power control procedure.

32. The access node of claim 18 wherein the control circuit is configured to generate power control commands according to an energy minimization power control procedure by:
    determining a minimum transmit power based on path loss, bandwidth and packet size; and
    determining a transmit power above a minimum transmit power and transmission time that minimizes energy per packet.

33. The access node of claim 18 wherein the control circuit is configured to generate power control commands according to an interference management power control procedure by:
    computing a path loss parameter based on path loss to a serving access node and a neighboring access node;
    comparing the path loss parameter to a first threshold; and
    if the path loss parameter is less than said first threshold, generating and sending a reduced power control command to reduce interference generated the wireless device.

34. The access node of claim 18 wherein the control circuit is configured to generate power control commands according to a radio resource optimization power control procedure by:
    computing a path loss parameter based on path loss to a serving access node and a neighboring access node;
    comparing the path loss parameter to a second threshold; and
    if the path loss parameter is greater than said second threshold, generating and sending an increased power control command to the wireless device.

35. A method of uplink power control implemented by an access node in a wireless communication network, said method comprising:
    determining an energy profile of the wireless device including a type of power supply;
    selecting a power control procedure from a set of two or more different power control procedures as a function of the type of the power supply; and
    generating power control commands according to the selected power control procedure, said power control commands comprising a power control parameter used by the wireless device to determine a transmit power; and
    sending the power control commands from the access node to the wireless device.

36. The method of claim 35 wherein:
    determining an energy profile of the wireless device comprises determining whether the wireless device has a limited power supply; and
    selecting a power control procedure as a function of the energy profile of the wireless device comprises selecting an energy minimization power control procedure if the wireless device has a limited power supply.

37. The method of claim 36 wherein selecting a power control procedure as a function of the energy profile further comprises selecting between a radio resource optimization power control procedure and an interference management power control procedure if the wireless device does not have a limited power supply.

38. The method of claim 37 wherein selecting between a radio resource optimization power control procedure and an interference management power control procedure if the wireless device does not have a limited power supply comprises:
    determining an amount of other cell interference;
    selecting the radio resource optimization power control procedure if the other cell interference is below an interference threshold; and selecting the interference management power control procedure if the other cell interference is above the interference threshold.

39. The method of claim 36 wherein selecting a power control procedure as a function of the energy profile further comprises selecting between the energy minimization power control procedure and an interference management power control procedure if the wireless device does not have a limited power supply.

40. The method of claim 39 wherein selecting between the energy minimization power control procedure and an interference management power control procedure if the wireless device does not have a limited power supply comprises:
   determining an amount of other cell interference; and
   selecting the energy minimization power control procedure if the other cell interference is below an interference threshold; and
   selecting the interference management power control procedure if the other cell interference is above the interference threshold.

41. An access node in a wireless communication network, said access node comprising:
   a transceiver circuit for communicating with one or more wireless devices; and
   a control circuit connected to said transceiver circuit for controlling the uplink transmit power of said wireless devices, said control circuit being configured to:
      determine an energy profile of the wireless device including a type of power supply;
      select a power control procedure from a set of two or more different power control procedures as a function of the type of the power supply; and
      generate power control commands according to the selected power control procedure, said power control commands comprising a power control parameter used by the wireless device to determine a transmit power; and
      send the power control commands from the access node to the wireless device.

42. The access node of claim 41 wherein the control circuit is further configured to:
   determine an energy profile of the wireless device by determining whether the wireless device has a limited power supply; and
   select an energy minimization power control procedure if the wireless device has a limited power supply.

43. The access node of claim 42 wherein the control circuit is further configured to select between a radio resource optimization power control procedure and an interference management power control procedure if the wireless device does not have a limited power supply.

44. The access node of claim 43 wherein the control circuit is further configured to select between a radio resource optimization power control procedure and an interference management power control procedure if the wireless device does not have a limited power supply by:
   determining an amount of other cell interference;
   selecting the radio resource optimization power control procedure if the other cell interference is below an interference threshold; and
   selecting the interference management power control procedure if the other cell interference is above the interference threshold.

45. The access node of claim 42 wherein the control circuit is further configured to select between the energy minimization power control procedure and an interference management power control procedure if the wireless device does not have a limited power supply.

46. The access node of claim 45 wherein the control circuit is further configured to select between energy minimization power control procedure and an interference management power control procedure if the wireless device does not have a limited power supply by:
   determining an amount of other cell interference;
   selecting the energy minimization power control procedure if the other cell interference is below an interference threshold; and
   selecting the interference management power control procedure if the other cell interference is above the interference threshold.

* * * * *